UNITED STATES PATENT OFFICE.

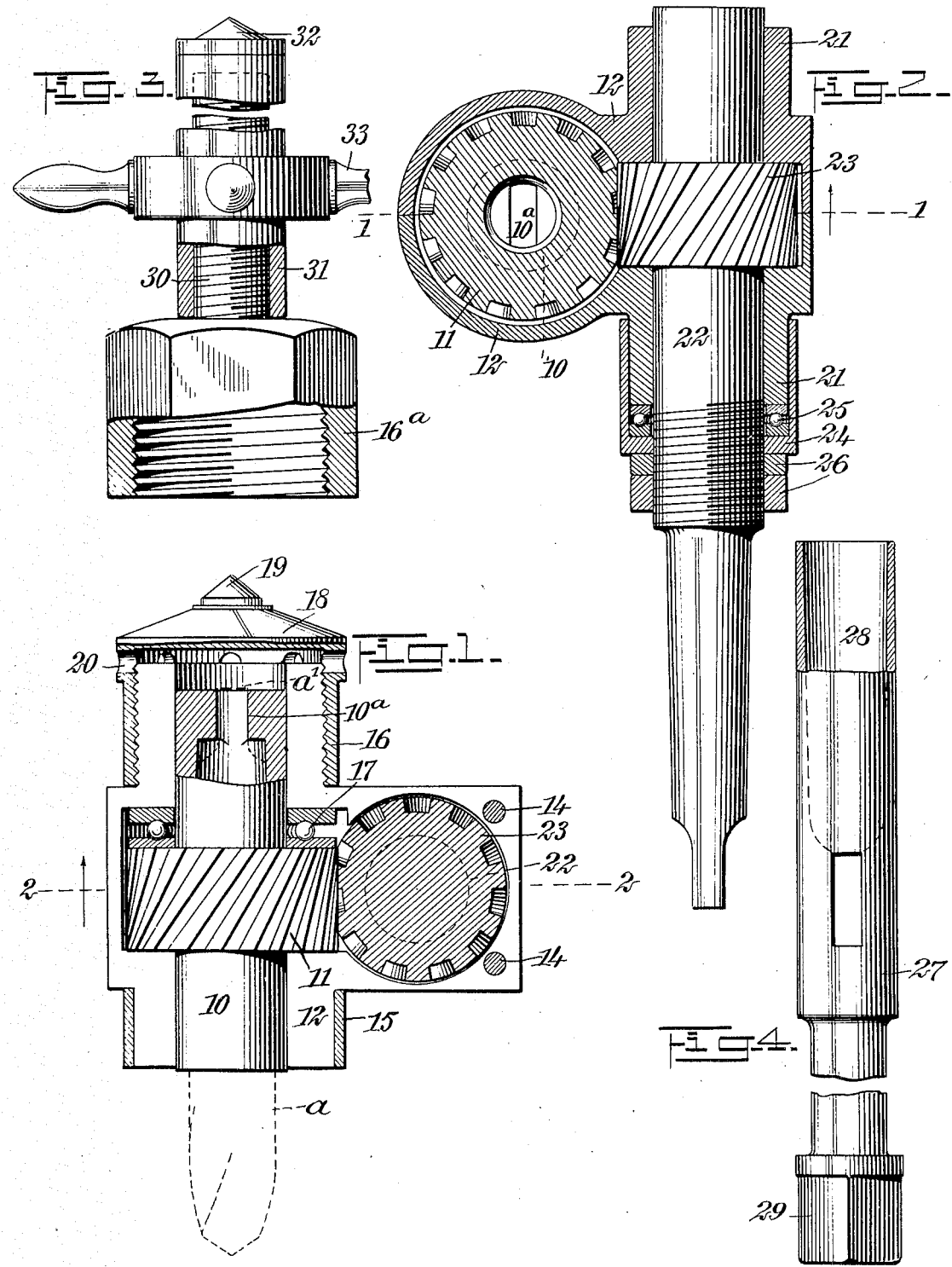

LOUIS K. MOORE AND GEORGE J. COSTELLO, OF PHILADELPHIA, PENNSYLVANIA.

DRILLING DEVICE.

No. 856,792.   Specification of Letters Patent.   Patented June 11, 1907.

Application filed April 28, 1906. Serial No. 314,191.

*To all whom it may concern:*

Be it known that we, LOUIS K. MOORE and GEORGE J. COSTELLO, both citizens of the United States, and residents of Philadelphia, in the county of Philadelphia and State of Pennsylvania, have invented a new and Improved Drilling Device, of which the following is a full, clear, and exact description.

Our invention relates to a device for carrying and driving drills, and our principal object is to so construct the device that it may be used to operate the drill in obscure and inconvenient places, and to drive the drill either by hand or motive power. In attaining this end we resort to certain special features of construction and combinations of parts, which will be fully set forth hereinafter and particularly pointed out in the claims.

Reference is to be had to the accompanying drawings which illustrate as an example the preferred embodiment of our invention, in which drawings Figure 1 is a sectional view of the invention along the line 1—1 of Fig. 2 showing the drill by broken lines; Fig. 2 is a section along the line 2—2 of Fig. 1; Fig. 3 is a detail view partly in section, showing a modified form of the feed nut; and Fig. 4 is a fragmentary view showing the extension shank which is intended particularly for use when the drill is being hand operated.

The drill, indicated by broken lines $a$ in Fig. 1, is held in a sleeve 10, which is provided at its inner end with an angular opening $10^a$ receiving the corresponding tang $a'$ of the shank of the drill, thus causing the drill to turn with the sleeve. Said sleeve is provided with a spiral gear 11 fastened to or formed integral therewith, and the sleeve and gear are inclosed in a case 12. This case may be either integral or in sections. As here shown it is formed of two sections held together by bolts 14, a band 15 and a feed nut 16. Said band and feed nut are concentric to the sleeve 10 and fitted on extensions of the case at opposite sides of the gear 11. Located at the rear side of the gear is a ball thrust bearing 17 which takes the strain due to the feed of the drill. The feed nut 16 in addition to assisting in holding the sections of the case 12 together is formed with a cap 18 having a center pivot 19, and openings 20 for the application of a spanner or the like by means of which the nut may be operated. The type of feed nut shown in Fig. 1 is especially adapted for close work where there is little room for the manipulation of the nut, said nut providing for the use of a spanner which may be introduced into comparatively narrow places, thus feeding the drill as the same operates.

The lateral off-set of the casing 12 adjacent to the bolts 14, is provided with bosses or bearings 21 in which the driving shaft 22 is revolubly mounted. This shaft is provided with a spiral gear 23 which is in mesh with the gear 11, so that the gear and sleeve 10 will be driven from the shaft 22. Fastened by threading to the drive shaft 22 is a cap 24, and between this cap and the end of the adjacent boss 21 a ball bearing 25 is arranged.

26 indicates lock nuts for fastening the cap 24 in place on the drive shaft. Said cap incloses the ball bearings and prevents dust and other foreign matter from entering between the same, and the bearing arranged in the position described resists the thrust of the driving movement imparted to the shaft 22. This shaft may be driven in any manner according to the conditions under which the driving device is used. It may be coupled to a source of motive power or it may be driven by hand, and in the latter case we prefer to employ an extension shank 27 having a socket 28 to receive the reduced and flattened end of the shaft 22, the end of the stem opposite the socket being squared, as indicated at 29, for the employment of a wrench or other device by means of which the parts 27 and 22 may be rotated.

If the drill is to be employed in positions which are not cramped for lack of room, we prefer to employ the feed device shown in Fig. 3, which comprises a cap $16^a$ screwing over the rear end of the case 10 and serving the same function as the cap 16 before described. Projecting from this cap is a screw 30 over which an internally threaded sleeve 31 operates. This sleeve is provided at its rear end with a center pivot 32, and intermediate the end of the sleeve a hand wheel 33 is arranged. Feeding is effected in this case not by screwing the cap on the casing, but by screwing the sleeve 31 on the screw 30, the cap being allowed to remain unmoved on the casing in order to assist in holding together the sections thereof.

In the use of the invention, if the device is to be employed in a cramped space the feed cap shown in Fig. 1 is employed, the drill being engaged with the work and the center pivot 19 of the cap being engaged with the backing against which the drill operates. The shaft 22 should then be rotated by power applied in any desired or convenient way, resulting in the corresponding rotation of the sleeve 10 and drill a. To feed the drill forward, a spanner or other suitable tool is introduced into the space and engaged with the opening 21 of the cap 16, thus feeding the drill forward as desired. If the space in which the device operates is not cramped the feeding means shown in Fig. 3 may be employed, this feed having it will be observed a much longer movement than that shown in Fig. 1, and, therefore, adapting the device to a large range of operations.

Having thus described the preferred form of our invention, what we actually claim and desire to secure by Letters Patent is:

1. A drilling device comprising a casing provided with oppositely disposed journal bearings and an intermediate chamber, a drill sleeve journaled in said bearings, a gear fixedly secured to said sleeve within said chamber, a feed sleeve having a threaded engagement with the exterior of one end of said casing, and a thrust bearing arranged within said chamber between one side of said gear and said end of the casing, substantially as shown and described.

2. A drilling device comprising a casing provided with oppositely disposed journal bearings, and an intermediate chamber, a drill sleeve journaled in said bearings, a gear fixedly secured to said sleeve within said chamber, feed mechanism connected with one end of said casing, a thrust bearing arranged within said chamber between the side of said gear and casing, and means adapted to rotate said gear, substantially as shown and described.

In testimony whereof we have signed our names to this specification in the presence of two subscribing witnesses.

LOUIS K. MOORE.
GEORGE J. COSTELLO.

Witnesses:
HARVEY BEAVER,
BERT CROWLEY.